(12) United States Patent
Suzuki et al.

(10) Patent No.: US 11,305,334 B2
(45) Date of Patent: Apr. 19, 2022

(54) METHOD AND APPARATUS FOR FORGING GEAR

(71) Applicant: TOYOTA JIDOSHA KABUSHIKI KAISHA, Toyota (JP)

(72) Inventors: Toshitaka Suzuki, Okazaki (JP); Takeshi Kimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 222 days.

(21) Appl. No.: 16/585,219

(22) Filed: Sep. 27, 2019

(65) Prior Publication Data
US 2020/0130046 A1   Apr. 30, 2020

(30) Foreign Application Priority Data
Oct. 31, 2018   (JP) .............................. JP2018-205721

(51) Int. Cl.
| | |
|---|---|
| *B21K 1/30* | (2006.01) |
| *B21J 13/02* | (2006.01) |
| *B21J 5/02* | (2006.01) |
| *B21J 5/06* | (2006.01) |
| *B21J 9/02* | (2006.01) |
| *B21J 5/12* | (2006.01) |
| *B22F 3/03* | (2006.01) |

(Continued)

(52) U.S. Cl.
CPC ................. *B21K 1/305* (2013.01); *B21J 5/02* (2013.01); *B21J 5/06* (2013.01); *B21J 5/12* (2013.01); *B21J 9/02* (2013.01); *B21J 13/02* (2013.01); *B21K 1/30* (2013.01); *B22F 3/03* (2013.01); *F16H 55/08* (2013.01); *F16H 55/12* (2013.01)

(58) Field of Classification Search
CPC .... B21K 1/30; B21K 1/305; B21J 5/02; B21J 5/06; B21J 5/12; B21J 9/02; B21J 13/02; B21D 53/28; B23P 15/14; B22F 3/03; B22F 2003/033
USPC ........... 72/353.2, 354.6, 355.2, 355.4, 355.6; 29/893.34
See application file for complete search history.

(56) References Cited

U.S. PATENT DOCUMENTS

| | | | |
|---|---|---|---|
| 3,813,909 A | | 6/1974 | Roger |
| 3,828,628 A | * | 8/1974 | Roger ..................... B21K 5/20 |
| | | | 76/107.1 |

(Continued)

FOREIGN PATENT DOCUMENTS

| | | |
|---|---|---|
| JP | 52-170834 U | 12/1977 |
| JP | 58-43842 U | 3/1983 |

(Continued)

*Primary Examiner* — Jessica Cahill
*Assistant Examiner* — Jared O Brown
(74) *Attorney, Agent, or Firm* — Sughrue Mion, PLLC

(57) ABSTRACT

The present disclosure provides a method for forging a gear capable of preventing burrs from being formed at an edge of the surface opposite to a direction in which a material in external teeth of the material is pushed. A first exemplary aspect is a method for moving the second punch along a tooth profile groove of the guide die to stack the material and the second punch in this order; and pushing the material and the second punch into a tooth profile groove of the tooth profile die in a stacked state to pass them therethrough, in which a tooth pressing part of the second punch covers at least an edge of a region where external teeth are formed on a surface of the material on the first punch side.

8 Claims, 15 Drawing Sheets

(51) Int. Cl.
*F16H 55/08* (2006.01)
*F16H 55/12* (2006.01)

(56) References Cited

U.S. PATENT DOCUMENTS 5,996,229 A * 12/1999 Yang .................. B21K 1/30
 72/355.6
2014/0007640 A1* 1/2014 Endo .................. B21K 1/305
 72/352

FOREIGN PATENT DOCUMENTS

| JP | 58107213 A * | 6/1983 | ............... B21K 1/30 |
| JP | 2016-097430 A | 5/2016 | |
| JP | 6393599 B2 * | 9/2018 | ............. B21K 1/305 |

* cited by examiner

METHOD AND APPARATUS FOR FORGING GEAR

CROSS REFERENCE TO RELATED APPLICATIONS

This application is based upon and claims the benefit of priority from Japanese patent application No. 2018-205721, filed on Oct. 31, 2018, the disclosure of which is incorporated herein in its entirety by reference.

BACKGROUND

The present disclosure relates to a method and an apparatus for forging a gear, and for example, to a method and an apparatus for forging a gear in which a material is pushed into a through hole of a tooth profile die from one side of the tooth profile die by a first punch and then a gear having external teeth formed thereon is discharged from the other side of the tooth profile die.

In common forging of gear, a material is pushed into a through hole of a tooth profile die by a punch, thereby forming external teeth on the material. For example, in the method for manufacturing a helical gear disclosed in Japanese Unexamined Patent Application Publication No. 2016-97430, a helical tooth forming die and a preforming die are stacked, and first the material is pushed inside of the preforming die to form a preliminary tooth profile on the material, then the material is pushed into the helical tooth forming die to form a helical tooth profile on the material. In this way, the method for manufacturing a helical gear disclosed in Japanese Unexamined Patent Application Publication No. 2016-97430 prevents an unfilled part from being generated at the tip of a gear.

SUMMARY

The applicant has however found the following problems. In common forging of gear, like in the method for manufacturing a helical gear disclosed in Japanese Unexamined Patent Application Publication No. 2016-97430, a material is pushed into a tooth forming die to form external teeth thereon. This causes a problem that burrs are formed at the edge of the surface opposite to the direction in which the material in the external teeth thereof is pushed.

The present disclosure has been made in view of the above-described problem and provides a method and an apparatus for forging a gear capable of preventing burrs from being formed at an edge of the surface opposite to a direction in which a material in external teeth thereof is pushed.

A first exemplary aspect is a method for forging a gear including pushing a material into a through hole of a tooth profile die from one side of the tooth profile die by a first punch and then discharging a gear having external teeth formed thereon from the other side of the tooth profile die by the first punch, the method including:

disposing, on one side of the tooth profile die, a guide die that includes a through hole having an inside diameter size smaller than an outside diameter size of one end of the through hole of the tooth profile die so that a tooth profile groove formed on an inner peripheral surface of the guide die and a tooth profile groove formed on an inner peripheral surface of the tooth profile die are continuously connected with each other;

pushing the material into the through hole of the guide die;

pushing a second punch into the through hole of the guide die subsequently to the material, inserting a tooth pressing part formed on an outer peripheral part of the second punch into the tooth profile groove of the guide die to move the second punch along the tooth profile groove of the guide die, and stacking the material and the second punch in this order; and pushing the material and the second punch into the tooth profile groove of the tooth profile die in a stacked state to pass them therethrough, in which the tooth pressing part of the second punch covers, when the material passes through the tooth profile groove of the tooth profile die, at least an edge of a region where external teeth are formed on a surface of the material on the first punch side.

This configuration makes it possible to press down, when external teeth are formed on the material, at least the edge (i.e., the edge of the surface opposite to the direction in which the material in the external teeth thereof is pushed) of the region where the external teeth are formed on a surface of the first punch side of the material by the tooth pressing part of the second punch. Accordingly, even if burrs are about to be formed on the surface of the material on the first punch side, there is almost no gap where burrs grow between the second punch and the tooth profile groove of the tooth profile die and thus it is possible to prevent burrs from being formed.

In the above-described method for forging a gear, it is preferred that an excess thickness of the material formed when the material passes through the tooth profile groove of the tooth profile die be shed from the material at a tooth base of the second punch when the second punch passes through the tooth profile groove of the tooth profile die, and be housed in a housing part that is formed in an outer peripheral surface of the second punch so as to be recessed with respect to a tooth bottom circle of the gear.

This configuration makes it possible to prevent the excess thickness of the material from adhering to the outer peripheral part of the second punch.

In the above-described method for forging a gear, it is preferred that an excess thickness of the material formed when the material passes through the tooth profile groove of the tooth profile die be continuously formed on a surface of the second punch on the material side in a circumferential direction of the second punch when the second punch passes through the tooth profile groove of the tooth profile die, and be housed in a concave housing part having an inside diameter size smaller than a diameter of the tooth bottom circle of the gear and an outside diameter size larger than the diameter of the tooth bottom circle of the gear.

This configuration makes it possible to prevent the excess thickness of the material from adhering to the outer peripheral part of the second punch.

Another exemplary aspect is an apparatus for forging a gear that pushes a first material into a through hole of a tooth profile die from one side of the tooth profile die by a first punch and then discharges a gear having external teeth formed thereon from the other side of the tooth profile die by the first punch, the apparatus for forging a gear including:

a second punch configured to be stacked with the first material; and a guide die configured to be disposed on one side of the tooth profile die and inserted with the first material and the second punch in this order, in which the guide die includes a through hole having an inside diameter size smaller than an outside diameter size of one end of the through hole of the tooth profile die, a tooth profile groove is formed on an inner peripheral surface of the guide die, and the tooth profile groove and a tooth profile groove that is formed on the tooth profile die are continuously connected with each other while the guide die is disposed on the one side of the tooth profile die, the first punch pushes the first material and the second punch into the tooth profile groove of the tooth profile die in a stacked state so that they pass therethrough, and the second punch includes a tooth pressing part configured to press at least an edge of a region where external teeth are formed on a surface of the first material on the first punch side, and the tooth pressing part is inserted into the tooth profile groove of the guide die and the tooth profile groove of the tooth profile die.

This configuration makes it possible to press down, when external teeth are formed on the material, at least the edge of the region where the external teeth are formed on a surface of the material on the first punch side by the tooth pressing part of the second punch. Accordingly, even if burrs are about to be formed on the surface of the material on the first punch side, there is almost no gap where burrs grow between the second punch and the tooth profile groove of the tooth profile die and thus it is possible to prevent burrs from being formed.

In the above-described apparatus for forging a gear, it is preferred that the second punch include:

a first plate member having the same cross-sectional shape as that of the gear;

a second plate member having the same cross-sectional shape as that of the gear and configured to be disposed at an interval from the first plate member in a thickness direction of the second punch; and a tubular member capable of passing through the through hole of the tooth profile die and configured to be disposed between the first plate member and the second plate member, and the tubular member be recessed with respect to the tooth bottom circle of the gear and include a housing part that houses an excess thickness that is shed from the first material.

This makes it possible to prevent the excess thickness of the material from adhering to the outer peripheral part of the second punch.

In the above-described apparatus for forging a gear, it is preferred that a transfer part configured to transfer a predetermined product shape to an end surface of the first material be formed on a surface of the second punch on the first material side.

This configuration makes it possible to reduce the number of steps for the post-processing performed after a gear has been formed, thereby improving productivity of the gear.

It is preferred that the above-described apparatus for forging a gear be a continuous forging apparatus in which the first material, the second punch, and a second material are inserted into the through hole of the guide die in this order, and a transfer part configured to transfer a predetermined product shape to an end surface of the second material be formed on a surface of the second punch on the second material side.

This configuration makes it possible to reduce the number of steps of the post-processing performed after a gear has been formed, thereby improving productivity of the gear.

In the above-described apparatus for forging a gear, it is preferred that the second punch include a concave housing part that is continuously formed on a surface of the second punch opposed to the first material in the circumferential direction of the second punch and houses an excess thickness of the first material, and the housing part have an inside diameter size smaller than the diameter of the tooth bottom circle of the gear and have an outside diameter size larger than the diameter of the tooth bottom circle of the gear.

This configuration makes it possible to prevent the excess thickness of the material from adhering to the outer peripheral part of the second punch.

The present disclosure can provide a method and an apparatus for forging a gear capable of preventing burrs from being formed at an edge of the surface opposite to a direction in which a material in external teeth of the material is pushed.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be described hereinafter in detail with reference to the drawings. However, the present disclosure is not limited to the embodiments shown below. Further, for the clarification of the explanation, the following descriptions and the drawings are simplified as appropriate.

First Embodiment

Figure 1:
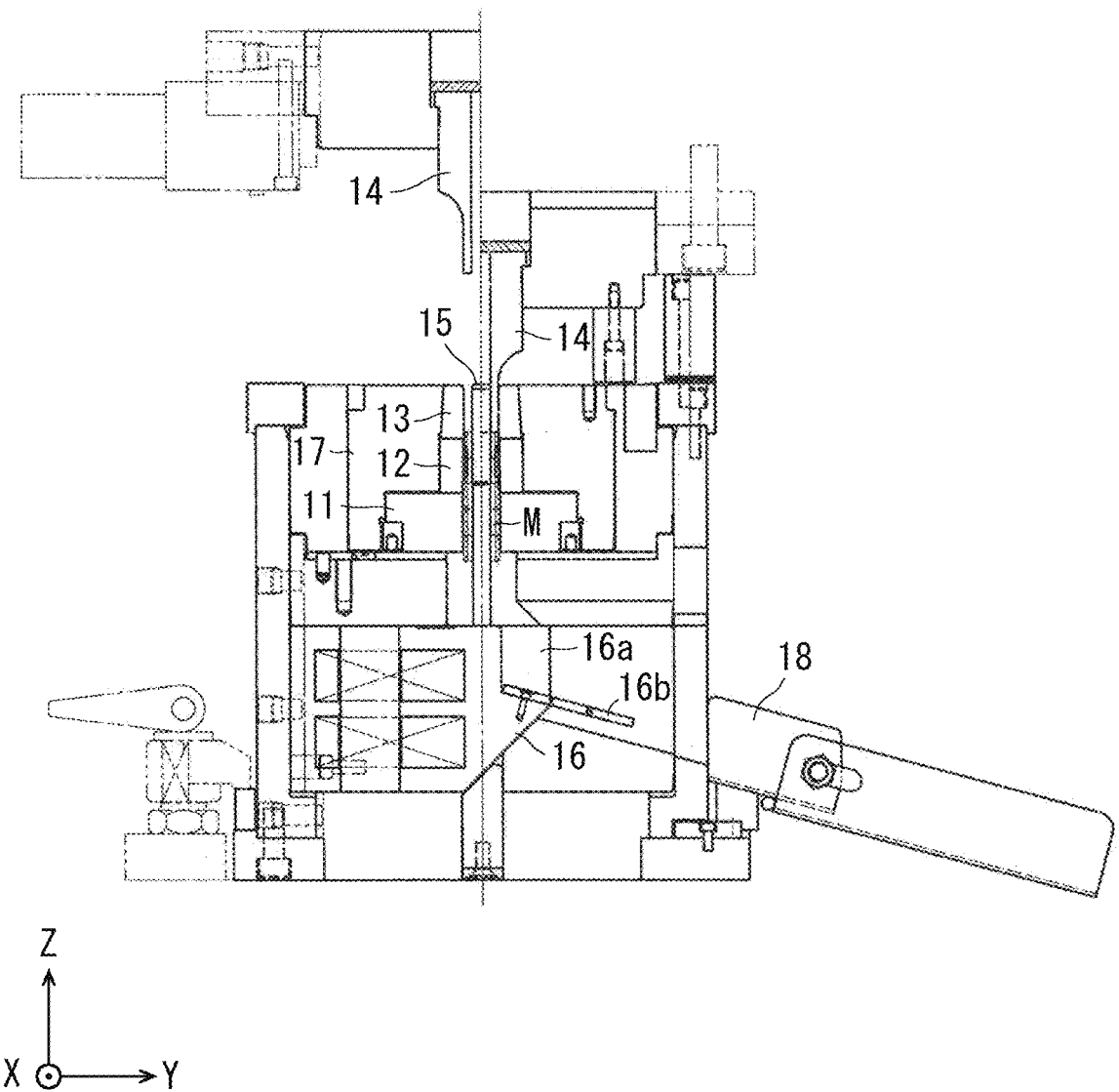
FIG. 1 is a partial cross-sectional view schematically showing a basic configuration of an apparatus for forging a gear according to a first embodiment.
Figure 2:
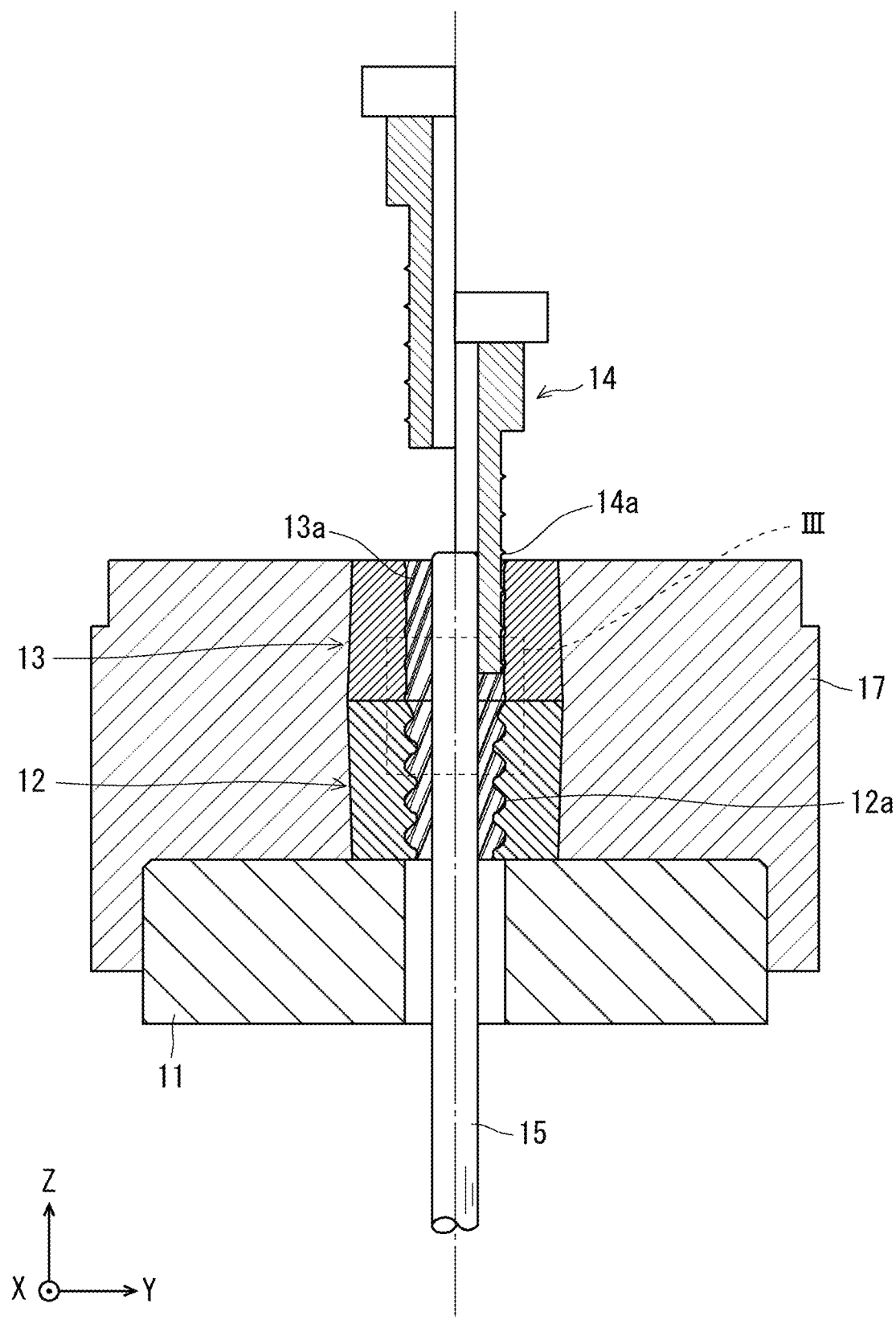
FIG. 2 is a partial cross-sectional view schematically showing a part of the apparatus for forging a gear according to the first embodiment.
Figure 3:
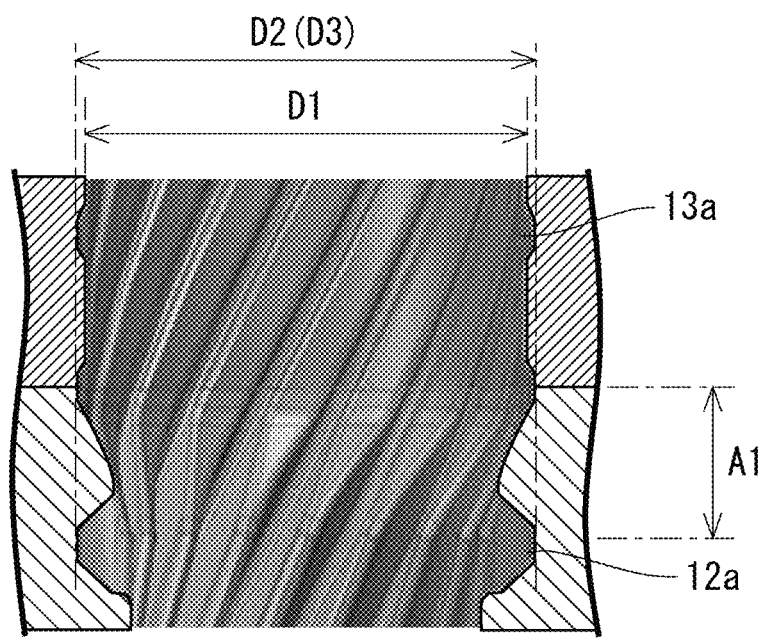
FIG. 3 is an enlarged diagram of a part III of FIG. 2.
Figure 3:
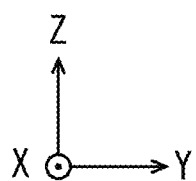
Figure 4:
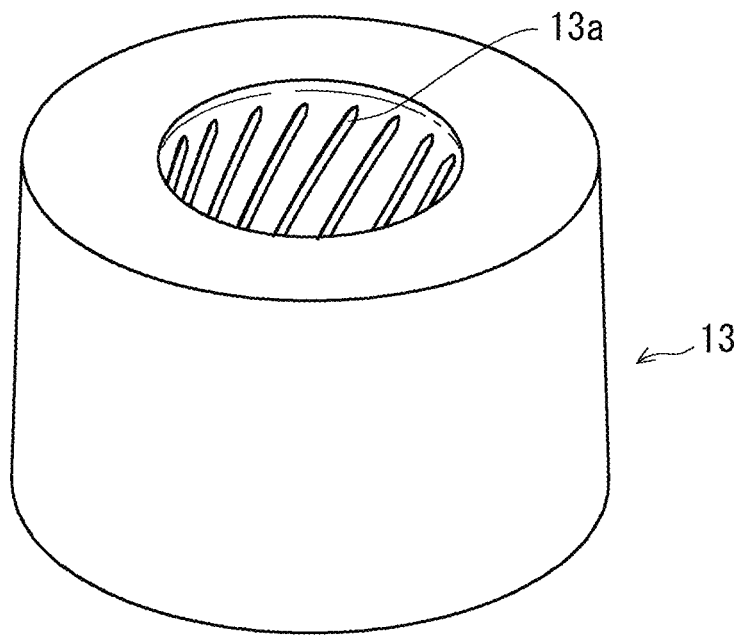
FIG. 4 is a perspective view schematically showing a guide die of the apparatus for forging a gear according to the first embodiment.

First, a basic configuration of an apparatus for forging a gear according to this embodiment is described. FIG. 1 is a partial cross-sectional view schematically showing the basic configuration of the apparatus for forging a gear according to this embodiment. FIG. 2 is a partial cross-sectional view schematically showing a part of the apparatus for forging a gear according to this embodiment. FIG. 3 is an enlarged diagram of a part III of FIG. 2. FIG. 4 is a perspective view schematically showing a guide die of the apparatus for forging a gear according to this embodiment. Note that hereinafter, three-dimensional (XYZ) coordinate systems are used for the clarification of the explanation.

An apparatus 1 for forging a gear according to this embodiment is configured so as to continuously forge a helical gear G as shown in FIG. 1. The apparatus 1 for forging includes a pressure plate 11, a tooth profile die 12, a guide die 13, a first punch 14, a mandrel 15, and a discharge member 16.

The pressure plate 11 includes a through hole through which the helical gear G having external teeth formed thereon can pass. The tooth profile die 12 actually forms external teeth having a predetermined shape (i.e., a product shape) in an outer peripheral surface of a cylindrical material M.

The tooth profile die 12 includes a through hole in which the material M is inserted as shown in FIGS. 1 and 2, and is disposed on the Z-axis positive side of the pressure plate 11 so that the through hole of the pressure plate 11 and the through hole of the tooth profile die 12 are continuously connected with each other in the Z-axis direction. Further, a spiral tooth profile groove 12a is formed on an inner peripheral surface of the through hole of the tooth profile die 12 so that the external teeth having a predetermined shape is transferred on an outer peripheral surface of the material M.

In this case, as shown in FIG. 3, a part of the Z-axis positive side of the through hole of the tooth profile die 12 is a forming space A1 of the external teeth, and an inside-diameter part (a small-diameter part) of the forming space A1 is formed in a tapered shape in which the inside-diameter part becomes narrower toward the inside of the tooth profile die 12 in a radial direction thereof as a location of the inside-diameter part gets closer to the Z-axis negative side.

Then, the external teeth having a predetermined shape is actually formed on the outer peripheral surface of the material M which has passed through the forming space A1 of the tooth profile die 12. Note that in FIG. 3, for the clarification of the shape of the tooth profile groove 12a of the tooth profile die 12 and the shape of a tooth profile groove 13a of the guide die 13 which is described later, the first punch 14 and the mandrel 15 are omitted.

The guide die 13 preforms a tooth tip of the external teeth having a predetermined shape on the outer peripheral surface of the material M. The guide die 13 includes a through hole in which the material M is inserted as shown in FIGS. 1 and 2, and is disposed on the Z-axis positive side of the tooth profile die 12 so that the through hole of the tooth profile die 12 and the through hole of the guide die 13 are continuously connected with each other in the Z-axis direction.

As shown in FIG. 4, the spiral tooth profile groove 13a is formed on an inner peripheral surface of the through hole of the guide die 13 so that the tooth tip of the external teeth having a predetermined shape is transferred on the outer peripheral surface of the material M, and the tooth profile groove 12a of the tooth profile die 12 and the tooth profile groove 13a of the guide die 13 are continuously connected with each other.

Note that as shown in FIG. 3, an inside diameter size (a small diameter size) D1 of the through hole of the guide die 13 is smaller than an outside diameter size (a large diameter) D2 on the Z-axis positive side of the forming space A1 of the tooth profile die 12 and an outside diameter size (a large diameter size) D3 of the through hole of the guide die 13 is substantially equal to the outside diameter size D2 on the Z-axis positive side of the forming space A1 of the tooth profile die 12, and the detailed functions thereof are described later.

A die case 17 holds the above-described pressure plate 11, tooth profile die 12, and guide die 13. The first punch 14 can be driven in the Z-axis direction and pushes the material M in the Z-axis negative direction.

Specifically, the first punch 14 basically has a cylindrical shape having an inside diameter size larger than an outside diameter size of the mandrel 15 which is described later, and as shown in FIG. 2, a screw part 14a that is meshed with the tooth profile groove 13a of the guide die 13 is formed on an outer peripheral surface of the first punch 14. Then, the first punch 14 is driven in the Z-axis direction by being rotated while the tooth profile groove 13a of the guide die 13 and the screw part 14a of the first punch 14 are meshed with each other.

Note that for the clarification of an operation of the first punch 14, FIGS. 1 and 2 show two states of the first punch 14 by dividing it into two at the central axis thereof. That is, in FIGS. 1 and 2, a state is shown on the Y-axis negative side with respect to the central axis in which the first punch 14 is removed from the through hole of the guide die 13, and a state is shown on the Y-axis positive side with respect to the central axis in which the first punch 14 is inserted into the through hole of the guide die 13. However, the first punch 14 is not divided in this manner and instead it is integrally driven in the Z-axis direction.

The mandrel 15 is a columnar member having an outside diameter size substantially equal to an inside diameter size of the helical gear G, and as shown in FIG. 1, it projects from an end of the pressure plate 11 on the Z-axis side thereof while being passed through the through hole of the pressure plate 11, the through hole of the tooth profile die 12, and the through hole of the guide die 13. The above-described mandrel 15 guides movement of the material M in the Z-axis direction while the material M is fitted thereto. At this time, the central axis of the through hole of the tooth profile die 12, the central axis of the through hole of the guide die 13, and the central axis of the mandrel 15 substantially overlap one another.

The discharge member 16 is disposed on the Z-axis negative side with respect to the mandrel 15. The discharge member 16 can be driven in the Y-axis direction, and is disposed, when the first punch 14 pushes the material M, on the Y-axis positive side to support the mandrel 15 from the Z-axis negative side.

Meanwhile, the discharge member 16 is disposed, when the helical gear G is discharged, on the Y-axis negative side, and a discharge part 16a formed on that discharge member 16 is disposed on the Z-axis negative side of the mandrel 15. Then, the helical gear G discharged from the through hole of the pressure plate 11 passes through the discharge part 16a, slides down an inclined plate 16b provided in the discharge member 16, and is discharged from a discharge port 18 of the apparatus 1 for forging to the outside.

When the above-described apparatus 1 for forging is used to form the helical gear G, the first punch 14 pushes the material M to the Z-axis negative side, like the common apparatus for forging does. This may cause burrs to be formed at the edge of the surface of the Z-axis positive side of the external teeth formed on the material M.

Figure 5:
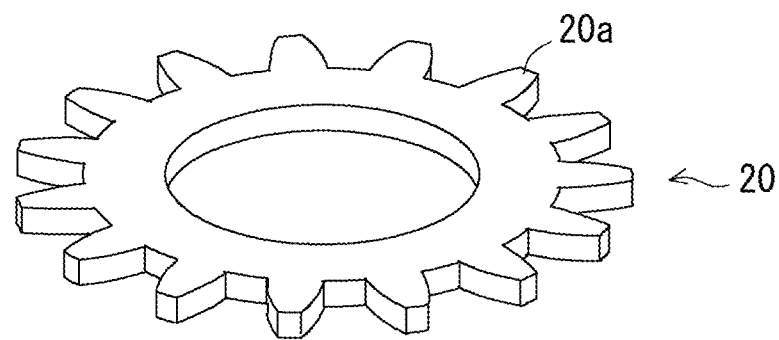
FIG. 5 is a perspective view schematically showing a second punch.
Figure 6:
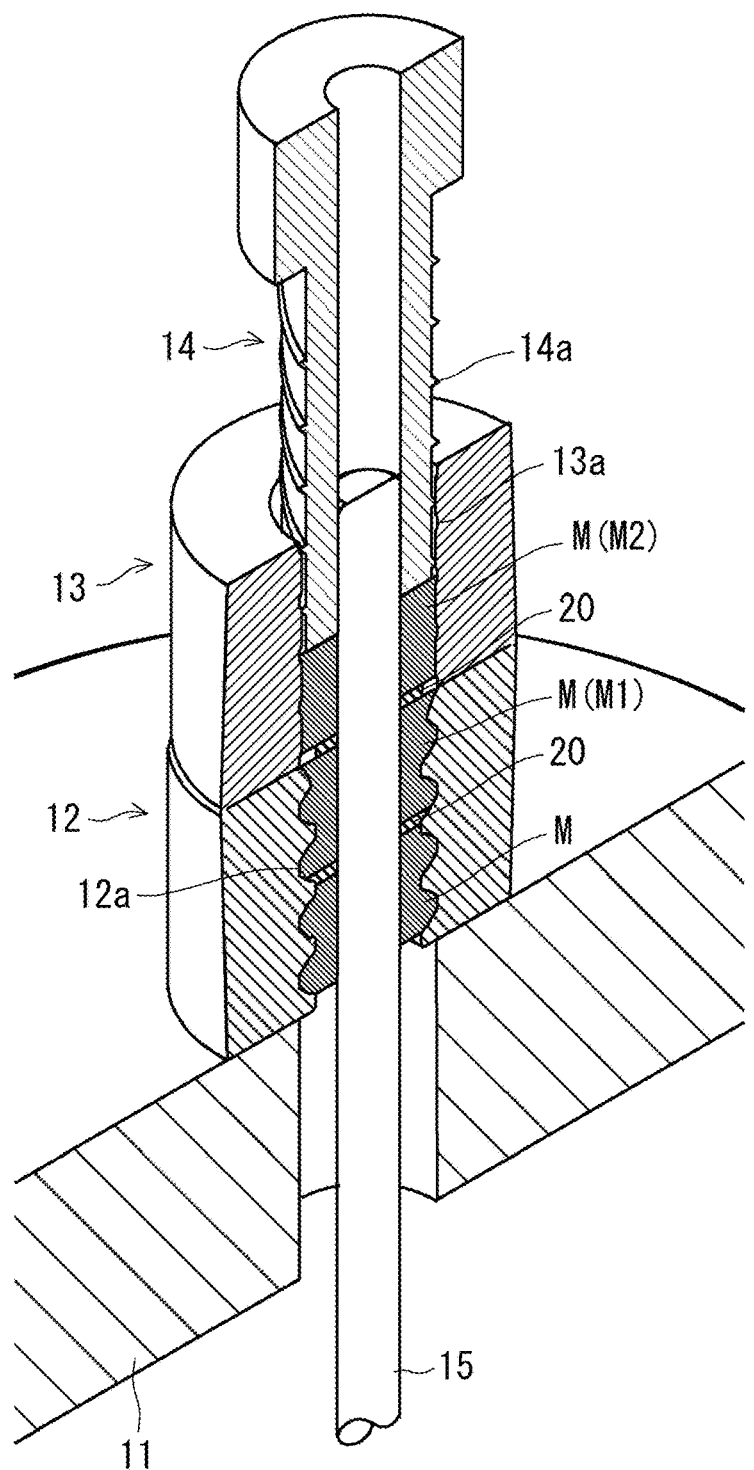
FIG. 6 is a cross-sectional view schematically showing a state in which the second punch is stacked with a material in a through hole of the guide die and a through hole of the tooth profile die.

In order to address the above problem, the apparatus 1 for forging according to this embodiment includes a second punch 20. FIG. 5 is a perspective view schematically showing the second punch. FIG. 6 is a cross-sectional view schematically showing a state in which the second punch is stacked with the material in the through hole of the guide die and the through hole of the tooth profile die.

As shown in FIG. 5, the second punch 20 includes a tooth pressing part 20a that covers, when the material M passes through the tooth profile groove 12a of the tooth profile die 12, at least the edge of a region where external teeth are formed on a surface of the Z-axis positive side of the material M.

For example, the second punch 20 is a gear-like plate member having substantially the same cross-sectional shape as that of the helical gear G and that is orthogonal to the axial direction of the helical gear G, and a tooth part of the second punch 20 serves as the tooth pressing part 20a, which is described later.

The above-described second punch 20 is inserted into the through hole of the guide die 13 so that it covers the material M from the Z-axis positive side as shown in FIG. 6. Specifically, the tooth pressing part 20a of the second punch 20 can be inserted into (meshed with) the tooth profile groove 13a of the guide die 13 and the tooth profile groove 12a of the tooth profile die 12.

Thus, when the second punch 20 rotates while the tooth pressing part 20a thereof is meshed with the tooth profile groove 13a of the guide die 13 or the tooth profile groove 12a of the tooth profile die 12, the second punch 20 moves along the tooth profile groove 13a of the guide die 13 and the tooth profile groove 12a of the tooth profile die 12.

Note that the tooth profile groove 13a of the guide die 13 and the tooth profile groove 12a of the tooth profile die 12 are substantially continuously connected with each other. Accordingly, when the second punch 20 is moved to the Z-axis negative side while being rotated, it covers the surface of the Z-axis positive side of the material M, while the phase of the external teeth formed on the material M and the phase of the tooth pressing part 20a of the second punch 20 substantially coincide with each other.

Figure 7:
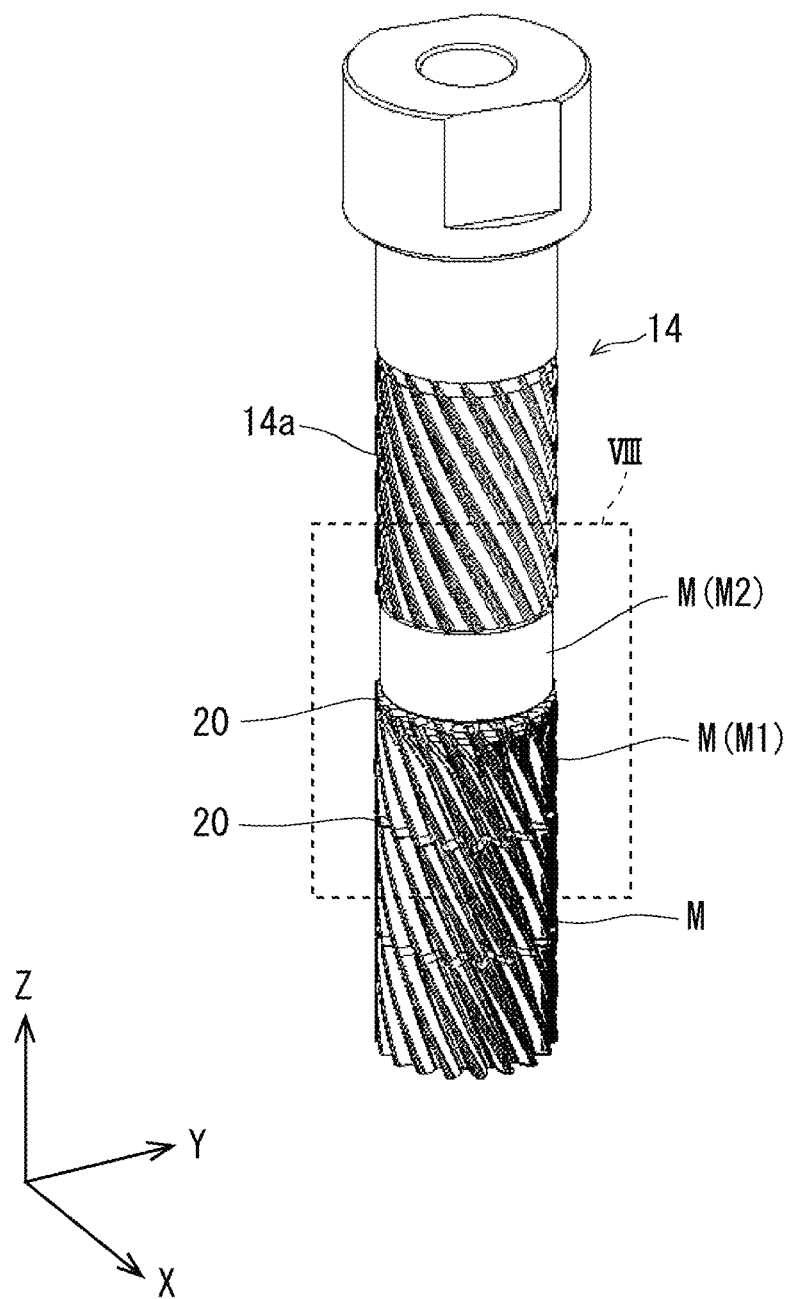
FIG. 7 is a perspective view schematically showing a state in which the second punch is stacked with the material.
Figure 8:
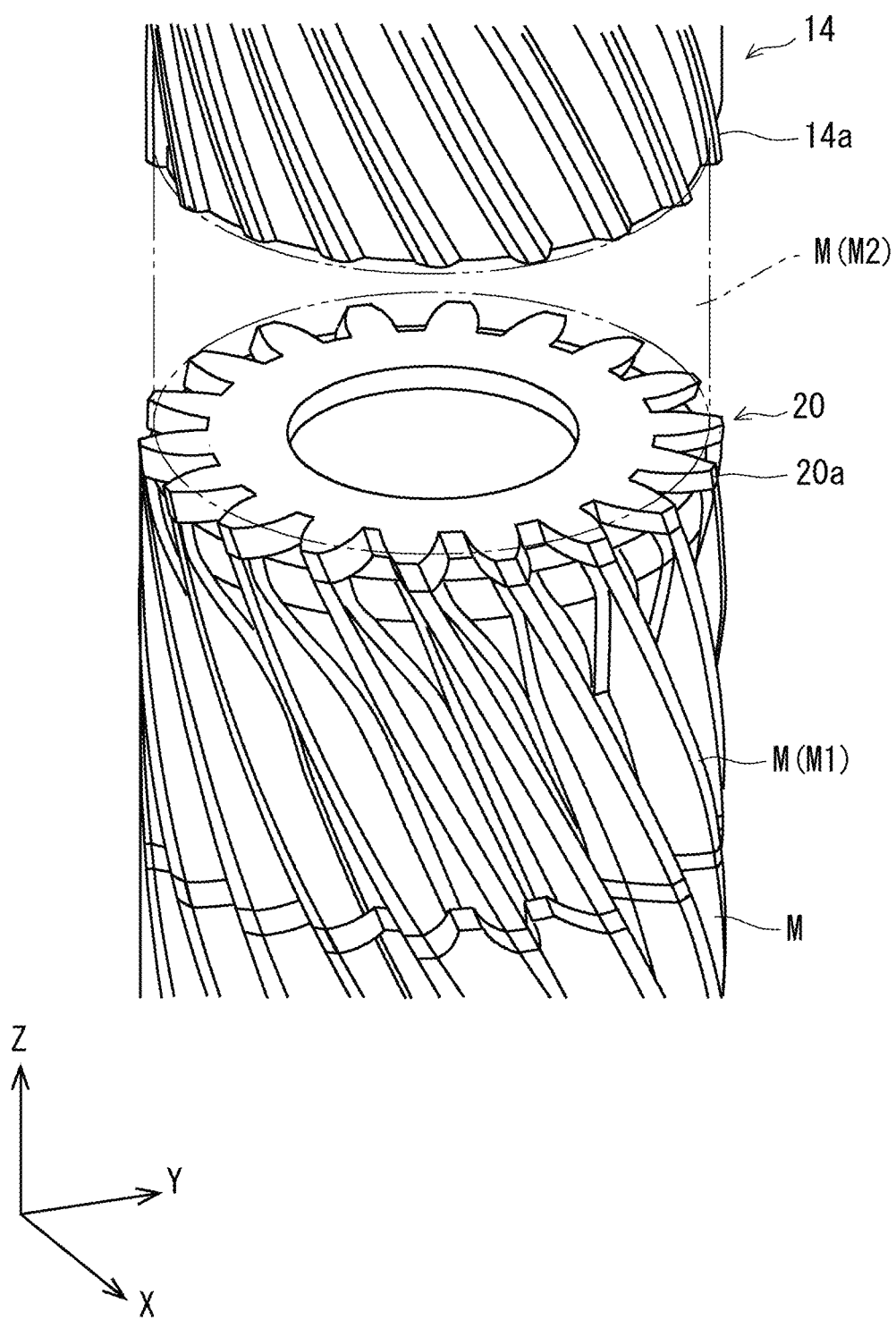
FIG. 8 is a partial perspective view of a part VIII of FIG. 7.

Next, a procedure of the method for forging a gear according to this embodiment is described. FIG. 7 is a perspective view schematically showing a state in which the second punch is stacked with the material. FIG. 8 is a partial perspective view of a part VIII of FIG. 7.

First, the mandrel 15 is passed through a through hole of the material M1 while a material (a first material) M1 is inserted into the through hole of the guide die 13 by moving the first punch 14 to the Z-axis negative side. Specifically, by passing the mandrel 15 through the through hole of the first punch 14 while the first punch 14 pushes the material M1 by being rotated and moved to the Z-axis negative side, the mandrel 15 is passed through the through hole of the material M1 while the material M1 is being pushed into the guide die 13.

Accordingly, the material M1 moves to the Z-axis negative side while being rotated along the tooth profile groove 13a of the guide die 13, thereby preforming a tooth tip of external teeth having a predetermined shape on an outer peripheral surface of the material M1.

Further, by moving the first punch 14 to the Z-axis negative side while it is being rotated, the material M1 is pushed to the Z-axis negative side and inserted into the through hole of the tooth profile die 12, and as shown in FIG. 6, the surface of the Z-axis positive side of the material M1 is disposed at a height substantially equal to that of the surface of the Z-axis positive side of the tooth profile die 12. By doing so, a part of the material M1 is passed through the forming space A1 of the tooth profile die 12, thereby forming external teeth having a predetermined shape on a part of the outer peripheral surface of the material M1.

Meanwhile, the remainder of the material M1 is still disposed in the forming space A1 of the tooth profile die 12. In this state, the first punch 14 is temporarily moved to the Z-axis positive side while being rotated and is removed from the through hole of the guide die 13.

Next, as shown in FIG. 6, the second punch 20 and a new material (a second material) M2 are inserted into the through hole of the guide die 13 in this order. Note that the tooth profile groove 12a of the tooth profile die 12 and the tooth profile groove 13a of the guide die 13 are substantially, continuously connected with each other, the inside diameter size D1 of the through hole of the guide die 13 is smaller than the outside diameter size D2 on the Z-axis positive side of the forming space A1 of the tooth profile die 12, and the outside diameter size D3 of the through hole of the guide die 13 is substantially equal to the outside diameter size D2 on the Z-axis positive side of the forming space A1 of the tooth profile die 12.

This configuration makes it possible to mesh the tooth pressing part 20a of the second punch 20 with the tooth profile groove 13a of the guide die 13 when the second punch 20 is inserted into the through hole of the guide die 13. Then, while the tooth pressing part 20a of the second punch 20 and the tooth profile groove 13a of the guide die 13 are meshed with each other, the first punch 14 pushes the second punch 20 and the new material M2 to the Z-axis negative side.

Accordingly, the second punch 20 is moved to the Z-axis negative side while being rotated along the tooth profile groove 13a of the guide die 13 and the new material M2 is moved to the Z-axis negative side while being rotated along the tooth profile groove 13a of the guide die 13, thereby preforming a tooth tip of external teeth having a predetermined shape on an outer peripheral surface of the new material M2.

At this time, as shown in FIGS. 7 and 8, the material M1, the second punch 20, and the new material M2 are stacked upon one another toward the Z-axis positive side in this order, the surface of the Z-axis positive side of the material M1 substantially comes into contact with the surface of the Z-axis negative side of the second punch 20, and the surface of the Z-axis negative side of the new material M2 substantially comes into contact with the surface of the Z-axis positive side of the second punch 20. Note that the new material M2 is simplified in FIGS. 7 and 8 in order to simplify the positional relation between the material M1 and the second punch 20. Further, the new material M2 is made invisible in FIG. 8.

Then, it is possible to move the second punch 20 along the tooth profile groove 13a of the guide die 13, whereby the tooth tip of the external teeth on the outer peripheral surface of the material M1 and the tooth pressing part 20a of the second punch 20 can be disposed at respective phases substantially equal to each other. Accordingly, the tooth pressing part 20a of the second punch 20 can reliably cover the region where external teeth are formed on the Z-axis positive side of the material M1.

Next, by moving the first punch 14 to the Z-axis negative side while being rotated, the material M1, the second punch 20 and the new material M2 are pushed to the Z-axis negative side in a stacked state. By doing so, while the material M1 is rotated along the tooth profile groove 12a of the tooth profile die 12, the remainder of that material M1 passes through the forming space A1.

At the same time, the tooth pressing part 20a of the second punch 20 is inserted into the tooth profile groove 12a of the tooth profile die 12, and then the second punch 20 passes through the forming space A1 of that tooth profile die 12 while being rotated along the tooth profile groove 12a of the tooth profile die 12.

Note that the second punch 20 is rotated along the tooth profile groove 12a of the tooth profile die 12 together with the material M1, and thus it is possible to maintain the state in which the tooth pressing part 20a of the second punch 20 covers the region where external teeth are formed on the surface of the Z-axis positive side of the material M1. That is, when the remainder of the material M1 passes through the forming space A1 of the tooth profile die 12, the second punch 20 can press down the region where external teeth are formed on the surface of the Z-axis positive side of the material M1 from the Z-axis positive side.

Accordingly, even if the excess thickness of the material M1 is about to project from the edge of the surface of the Z-axis positive side of the external teeth formed on that material M1, the second punch 20 pushes that excess thickness to the Z-axis negative side. In this way, it is possible to prevent burrs from being formed on the surface of the Z-axis positive side of the external teeth formed on the material M1.

After that, by moving the first punch 14 to the Z-axis negative side while being rotated, the material M1, the second punch 20, and the new material M2 are pushed to the Z-axis negative side in a stacked state, and the surface of the Z-axis positive side of the new material M2 and the surface of the Z-axis positive side of the tooth profile die 12 are disposed at a height substantially equal to each other.

Then, in the same manner as that in the case of the above-described procedure, the helical gear G is continuously formed by repeating the process of removing the first punch 14 from the through hole of the guide die 13, inserting a new second punch and a new material into the through hole of the guide die 13 in this order and pushing them by the first punch 14.

As described above, the method and the apparatus 1 for forging a gear according to this embodiment can prevent burrs from being formed on the surface of the Z-axis positive side of the external teeth formed on the material M. That is, when external teeth are formed on the material M, at least the edge of the region where external teeth are formed on the surface of the Z-axis positive side of the material M1 is pressed down by the tooth pressing part 20a of the second punch 20. Accordingly, even if burrs are about to be formed on the surface of the Z-axis positive side of the external teeth formed on the material M, there is almost no gap where burrs grow between the second punch 20 and the tooth profile groove 12a of the tooth profile die 12 and thus it is possible to prevent burrs from being formed.

Moreover, the method and the apparatus 1 for forging a gear according to this embodiment use the guide die 13 to form a tooth tip of external teeth on the material M, and thus can sufficiently fill the tooth tip of the external teeth with the material M. Accordingly, it is possible to improve accuracy of the shape of the helical gear G.

Further, the method and the apparatus 1 for forging a gear according to this embodiment move the second punch 20 to the Z-axis negative side while rotating the second punch 20 along the tooth profile groove 13a of the guide die 13, and thus can make the phase of the tooth pressing part 20a of the second punch 20 substantially coincide with the phase of the tooth tip of the external teeth formed on the material M.

Note that the relation of the following <Expression 1> preferably holds among the inside diameter size D1 of the through hole of the guide die 13, the outside diameter size D2 on the Z-axis positive side of the forming space A1 of the tooth profile die 12, and an outside diameter size D4 of the material M.

$$D4<D1<D2 \qquad \text{<Expression 1>}$$

Due to the above relation, the material M, which has the outside diameter size D4 smaller than the outside diameter size D2 on the Z-axis positive side of the forming space A1 of the tooth profile die 12 and has not yet been pushed into the thorough hole of the tooth profile die 12, is constrained by the thorough hole of the guide die 13 having the inside diameter size D1 smaller than the outside diameter size D2 on the Z-axis positive side of the forming space A1 of the tooth profile die 12, in a state in which the outside diameter size of the material M is smaller than the outside diameter size D2.

Accordingly, the material M is not expanded to the outside diameter size D2 on the Z-axis positive side of the forming space A1 of the tooth profile die 12 (i.e., the material M is not upset) and is pushed into the through hole of the tooth profile die 12. This reduces a molding load at the time of forging. As a result, the life of the teeth profile die 12 can be extended.

Note that not only the upper limit of the inside diameter size D1 of the through hole of the guide die 13 and the upper limit of the outside diameter size D4 of the material M are defined, but also the respective lower limits thereof may be defined using a pitch circle diameter D5 of the helical gear G so that the relation of the following <Expression 2> holds.

$$D5<D4<D1<D2 \qquad \text{<Expression 2>}$$

Second Embodiment

When the second punch 20 according to the first embodiment is used to form a helical gear G, the excess thickness of the material M formed when the material M passes through the forming space A1 of the tooth profile die 12 may flow into a gap between the second punch 20 and the tooth profile groove 12a of the tooth profile die 12 and adhere to the outer peripheral part of the second punch 20.

Figure 9:
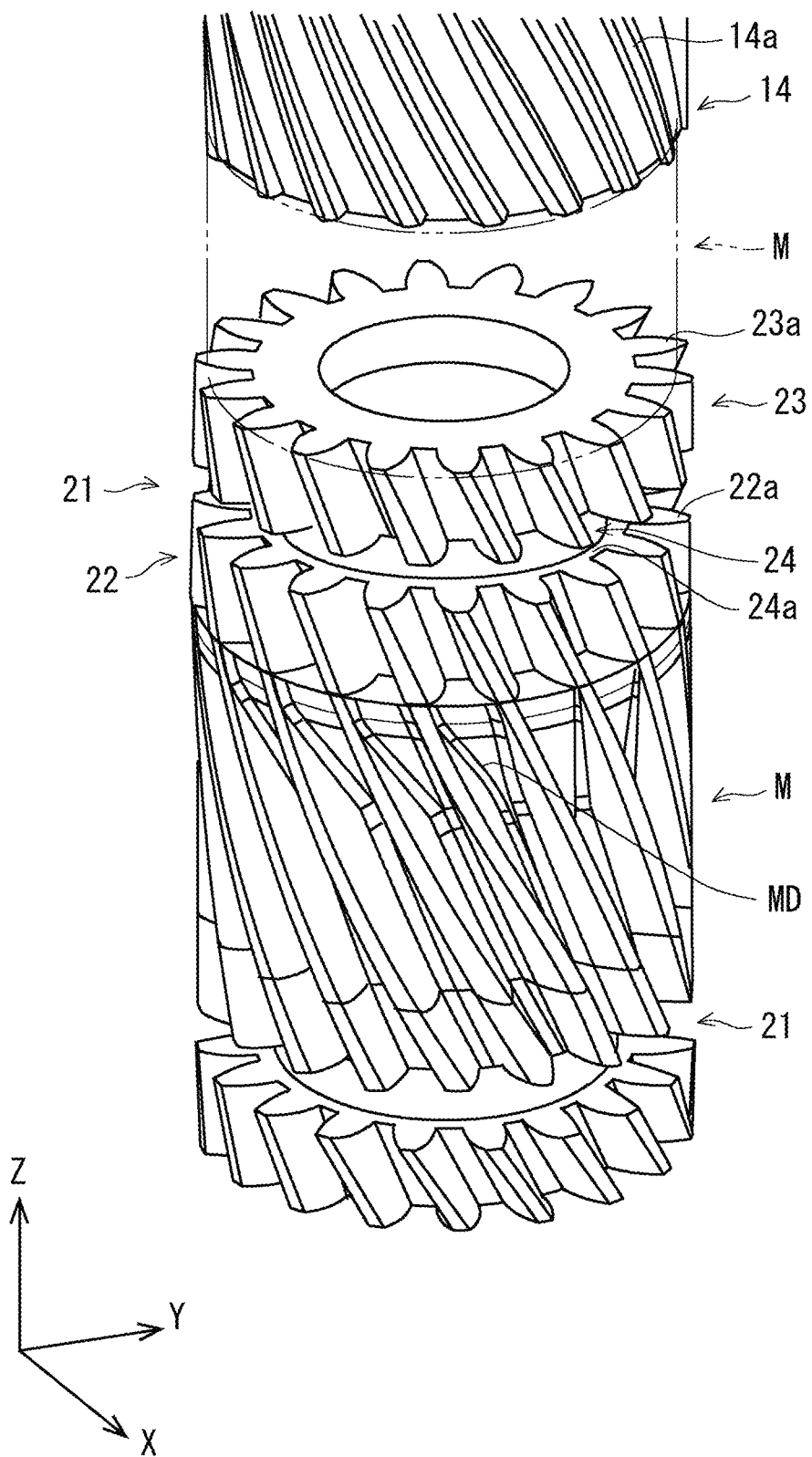
FIG. 9 is a partial perspective view schematically showing a state in which the second punch is stacked with the material.
Figure 10:
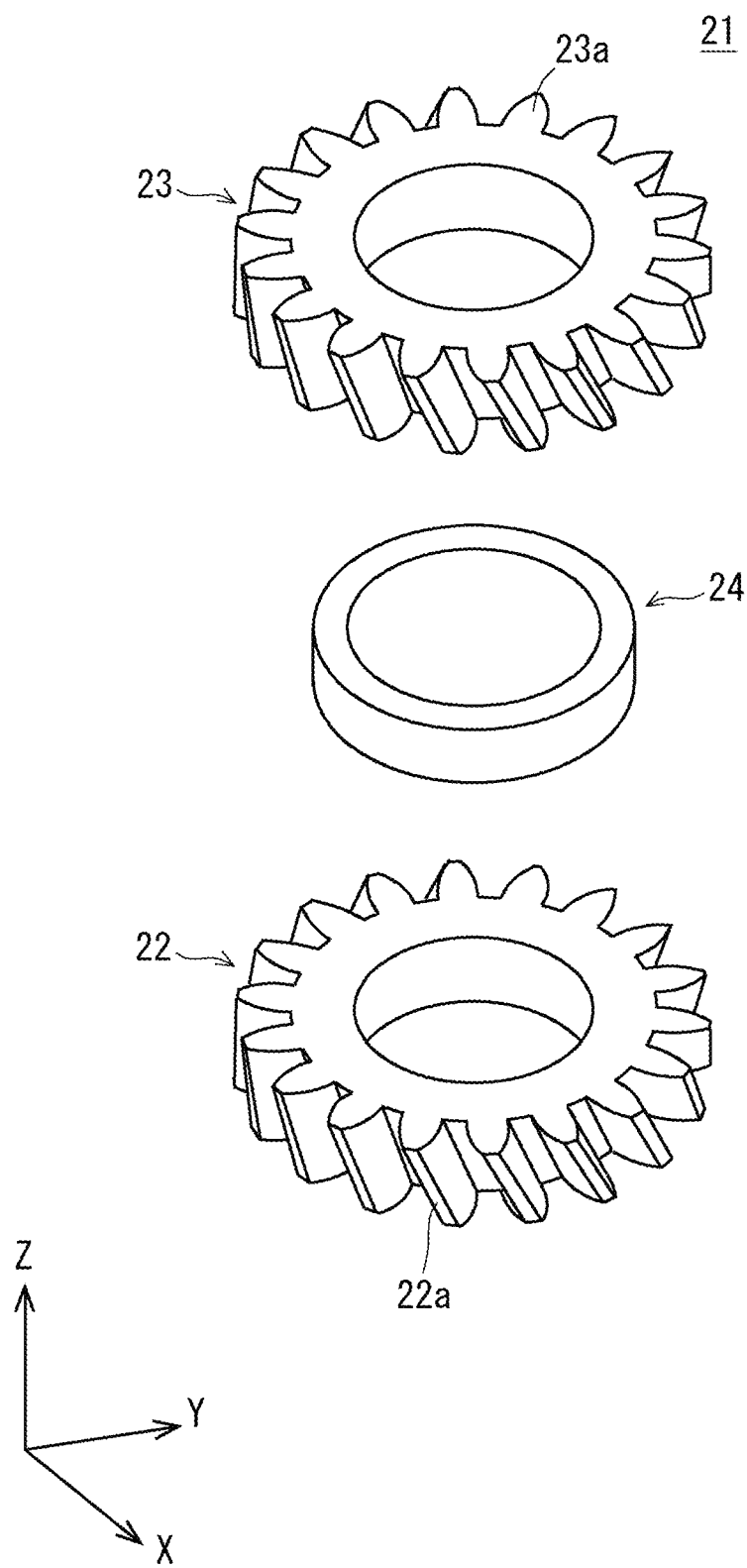
FIG. 10 is an exploded view schematically showing the second punch.

In order to address the above problem, a second punch according to this embodiment is configured so that it can house the excess thickness broken from the material M when the material M passes through the tooth profile groove 12a of the tooth profile die 12. FIG. 9 is a partial perspective view schematically showing a state in which the second punch is stacked with the material. FIG. 10 is an exploded view schematically showing the second punch. Note that a part of the material M is simplified and made invisible in FIG. 9.

As shown in FIG. 9, a second punch 21 according to this embodiment covers, when the material M passes through the forming space A1 of the tooth profile die 12, at least an edge of a region where external teeth are formed on the surface of the Z-axis positive side of the material M. Specifically, as shown in FIG. 10, the second punch 21 includes a first plate member 22, a second plate member 23, and a tubular member 24.

The first plate member 22 is a gear-like plate member having substantially the same cross-sectional shape as that of the helical gear G and that is orthogonal to the axial direction of the helical gear G. The second plate member 23 is also a gear-like plate member having substantially the same cross-sectional shape as that of the helical gear G and that is orthogonal to the axial direction of the helical gear G. The above first and second plate members 22 and 23 are disposed at intervals in the Z-axis direction (i.e., the thickness direction of the second punch 21).

Note that the first plate member 22 and the second plate member 23 are disposed in a state in which a phase of a tooth part 22a of the first plate member 22 and a phase of a tooth part 23a of the second plate member 23 are shifted from each other so that the tooth part 22a of the first plate member 22 and the tooth part 23a of the second plate member 23 can be meshed with the tooth profile groove 12a of the tooth profile die 12 and the tooth profile groove 13a of the guide die 13.

The tubular member 24 has a shape allowing it pass through the tooth profile groove 12a of the tooth profile die 12, and is disposed between the first plate member 22 and the second plate member 23. Then, as shown in FIG. 9, the tubular member 24 includes a housing part 24a that is recessed with respect to a tooth bottom circle of the helical gear G and houses the excess thickness (bur) broken from the material M.

For example, the tubular member 24 is composed of a tubular member having an outside diameter size smaller than a diameter of the tooth bottom circle of the helical gear G, and a part at an inner side in a radial direction of the tubular member 24 with respect to the diameter of the tooth bottom circle of the helical gear G serves as the housing part 24a.

The above-described second punch 21 is disposed so as to be stacked with the material M as shown in FIG. 9. At this time, the tooth part 22a of the first plate member 22 substantially comes into contact with the surface of the region where external teeth are formed on the Z-axis positive side of the material M disposed on the Z-axis negative side with respect to the second punch 21. Then, the tooth part 23a of the second plate member 23 substantially comes into contact with the surface of a region where external teeth are formed on the Z-axis negative side of the material M disposed on the Z-axis positive side with respect to the second punch 21.

Then, the first punch 14 pushes the material M and the second punch 21 to pass them through the tooth profile groove 12a of the tooth profile die 12, whereby the excess thickness (i.e., the material of a delta part MD protruding in the radial direction of the material M from the forming space A1 of the tooth profile die 12 in the material M) of the material M flows to the Z-axis positive side when the material M passes through the forming space A1 of the tooth profile die 12.

At this time, when the excess thickness of the material M is about to enter a gap between the first plate 22 of the second punch 21 and the tooth profile groove 12a of the tooth profile die 12, the excess thickness is shed and broken from the material M at a tooth base of that first plate 22, then housed in the housing part 24a of the tubular member 24.

As described above, by using the second punch 21 according to this embodiment to form the external teeth on the material M, it is possible to break the excess thickness of the material M therefrom and house it in the housing part 24a of the tubular member 24. By doing so, it is possible to prevent the excess thickness of the material M from adhering to an outer peripheral part of the second punch 21 compared to the case where the second punch 20 according to the first embodiment is used to form the external teeth on the material M.

Figure 11:
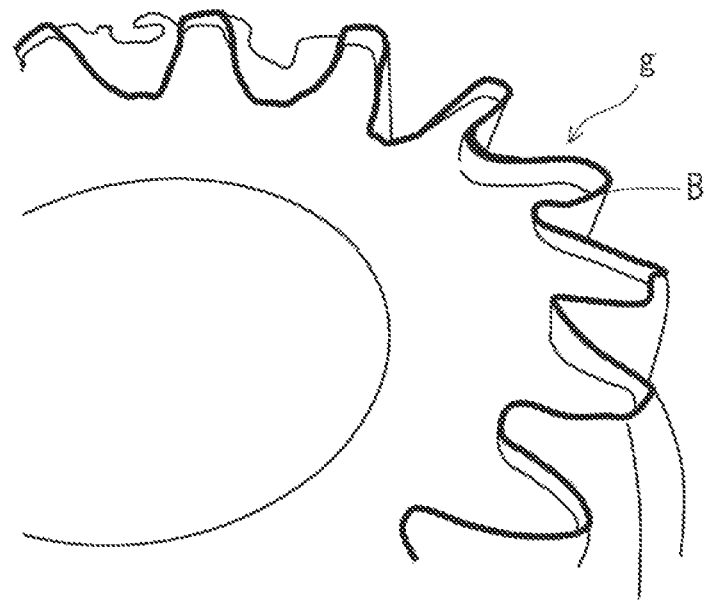
FIG. 11 is a photograph showing a helical gear formed without using the second punch.
Figure 12:
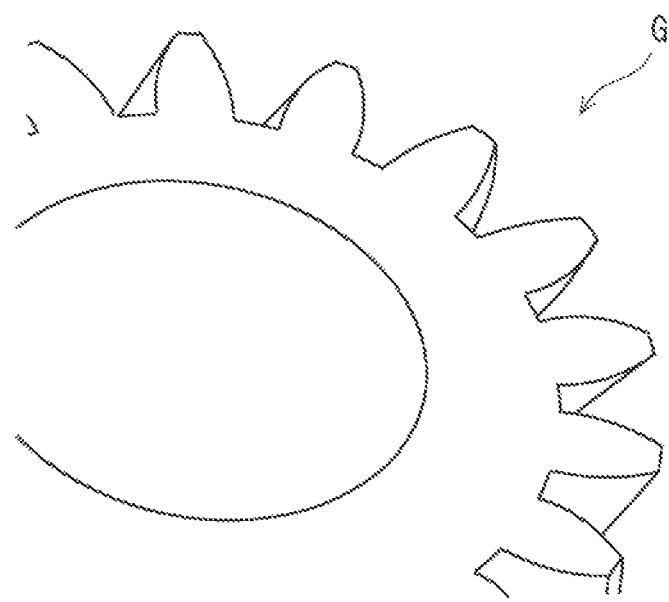
FIG. 12 is a photograph showing a helical gear formed using the second punch according to the second embodiment.

FIG. 11 is a photograph showing the helical gear formed without using the second punch. FIG. 12 is a photograph showing the helical gear formed using the second punch according to this embodiment. The helical gear g formed without using the second punch 21 has an excess thickness B formed on the end surface thereof as shown in FIG. 11, while the helical gear G formed using the second punch 21 has almost no excess thickness B formed on the end surface thereof as shown in FIG. 12.

Note that the tubular member 24 does not couple the first plate member 22 to the second plate member 23, but may couple the first plate member 22 to the second plate member 23.

Further, the tubular member 24 according to this embodiment is composed of a tubular member having the outside diameter size smaller than the diameter of the tooth bottom circle of the helical gear G, but not limited to this. The tubular member 24 may have a shape allowing it to pass through the tooth profile groove 12a of the tooth profile die 12, and the housing part 24a may be formed on at least a part of the tubular member 24 so that the housing part 24a is recessed with respect to the tooth bottom circle of the helical gear G.

Third Embodiment

Figure 13:
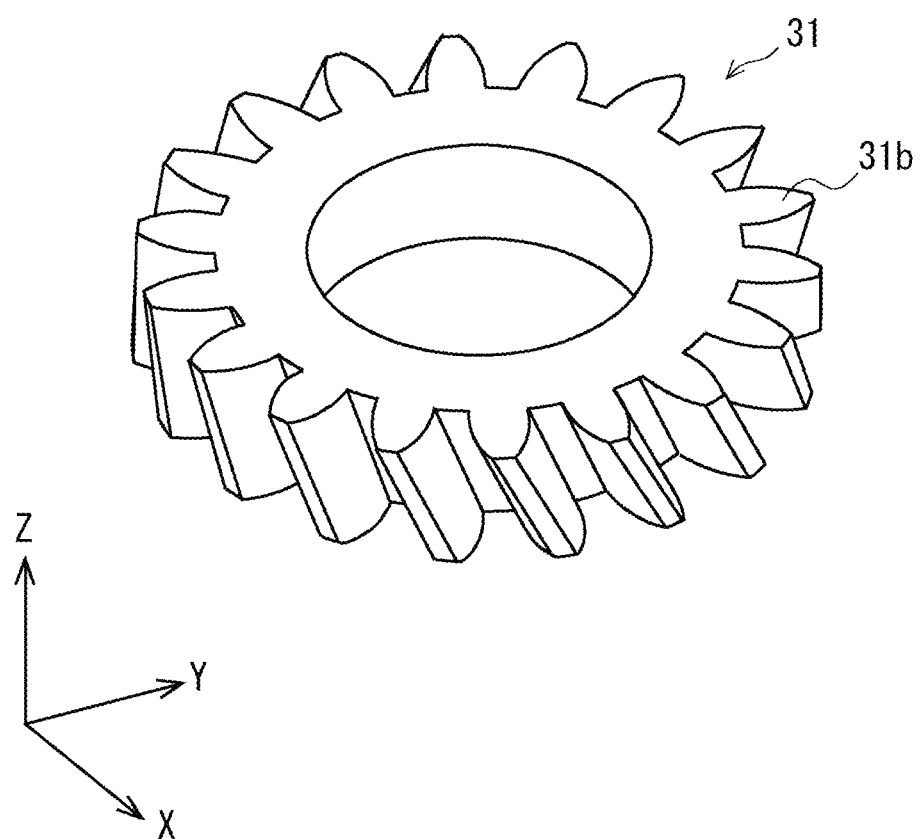
FIG. 13 is a perspective view schematically showing the second punch according to a third embodiment.
Figure 14:
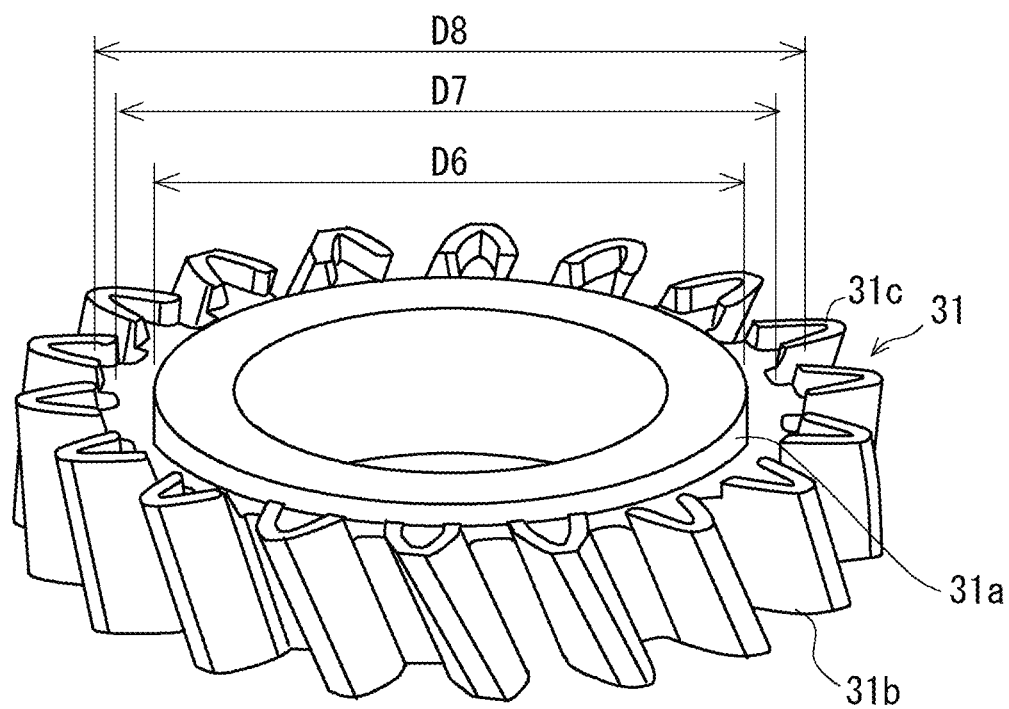
FIG. 14 is a different perspective view schematically showing the second punch according to the third embodiment.
Figure 15:
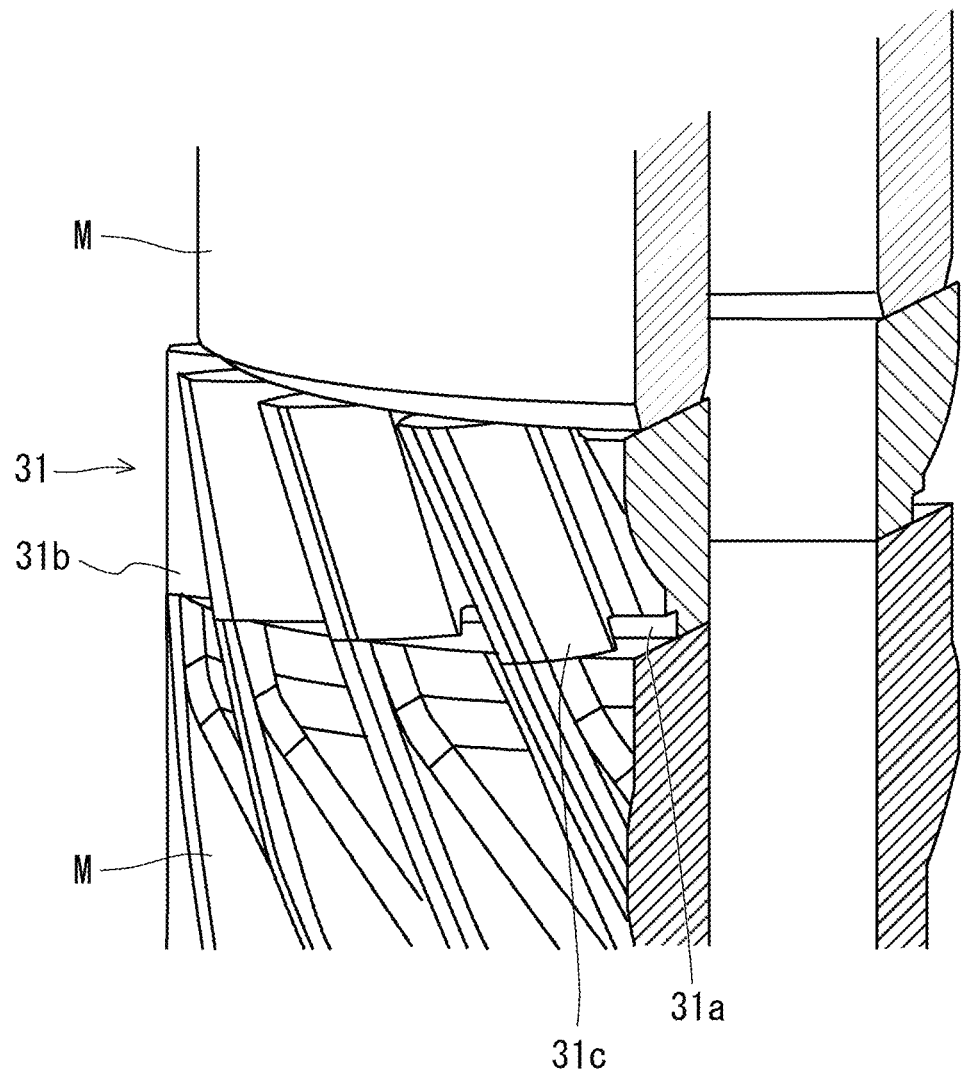
FIG. 15 is a cross-sectional view schematically showing a state in which the second punch according to the third embodiment is stacked with the material.

A second punch according to this embodiment includes a housing part that houses, when the material M passes through the tooth profile groove 12a of the tooth profile die 12, an excess thickness of that material M. FIG. 13 is a perspective view schematically showing the second punch according to this embodiment. FIG. 14 is a different perspective view schematically showing the second punch according to this embodiment. FIG. 15 is a cross-sectional view schematically showing a state in which the second punch according to this embodiment is stacked with the material. Note that the material which is disposed on the Z-axis positive side with respect to the second punch is simplified in FIG. 15.

As shown in FIGS. 13 and 14, a second punch 31 according to this embodiment has substantially the same shape as that of the second punch 20 according to the first embodiment but includes a housing part 31a that houses an excess thickness of the material M on the surface of the Z-axis negative side thereof.

Specifically, as shown in FIG. 14, the housing part 31a has an annular ring shape continuously formed in the circumferential direction of the second punch 31, and is concavely formed on the Z-axis positive side. Further, an inside diameter size (a small diameter size) D6 of the housing part 31a is smaller than a diameter D7 of a tooth bottom circle of a helical gear G while an outside diameter size (a large diameter size) D8 of the housing part 31a is larger than the diameter D7 of the tooth bottom circle of the helical gear G.

Note that a shape of the second punch 31 at an outer side in the radial direction with respect to the housing part 31a on the surface of the Z-axis negative side of the second punch 31 may be any shape which can cover at least the edge of the region where external teeth are formed on a surface of the Z-axis positive side of the material M. As shown in FIG. 14, in this embodiment, a tooth pressing part 31c is formed along the edge of a tooth part 31b of the second punch 31, and the tooth pressing part 31c has a hollow part inside, the hollow part and the housing part 31a being continuously connected with each other. This configuration makes it possible to increase a housing volumetric capacity of the excess thickness of the material M.

The above-described second punch 31 is disposed so as to be stacked with the material M as shown in FIG. 15. At this time, the tooth pressing part 31c of the second punch 31 comes into contact with the edge of the region where external teeth are formed on the surface of the Z-axis positive side of the material M disposed on the Z-axis negative side with respect to the second punch 31.

Then, the first punch 14 pushes the material M and the second punch 21 to pass them through the tooth profile groove 12a of the tooth profile die 12, whereby the excess thickness of the material M flows to the Z-axis positive side when the material M passes through the forming space A1 of the tooth profile die 12.

At this time, the housing part 31a is formed so as that the inside diameter size (the small diameter) D6 is smaller than the diameter D7 of the tooth bottom circle of the helical gear G and the outside diameter size (the large diameter) D8 is larger than the diameter D7 of the tooth bottom circle of the helical gear G, and thus the excess thickness of the material M flows, while entering the housing part 31a, inside the housing part 31a in the circumferential direction of the material M and is housed in the housing part 31a.

As described above, by using the second punch 31 according to this embodiment to form the external teeth on the material M, it is possible to house the excess thickness of the material M in the housing part 31a of the second punch 31. By doing so, it is possible to prevent the excess thickness of the material M from adhering to an outer peripheral part of the second punch 31 compared to the case where the second punch 20 according to the first embodiment is used to form the external teeth on the material M.

Fourth Embodiment

Figure 16:
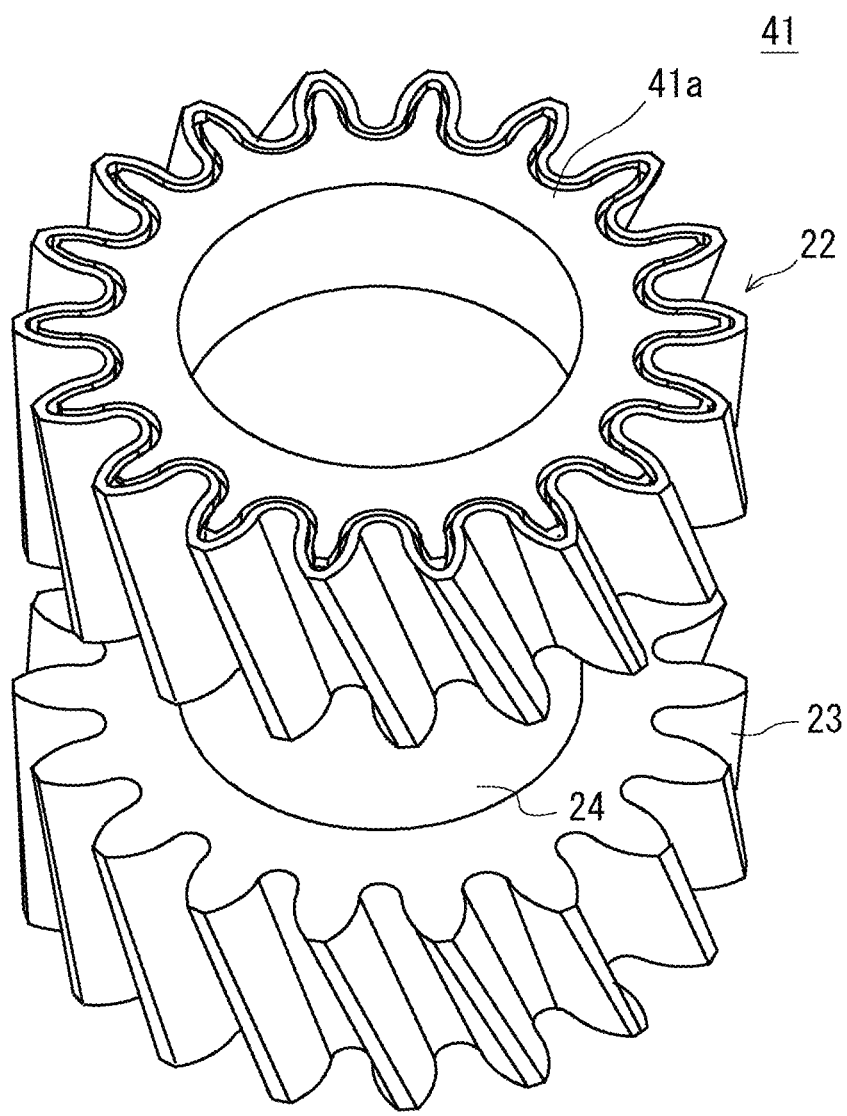
FIG. 16 is a perspective view schematically showing the second punch according to a fourth embodiment.
Figure 16:
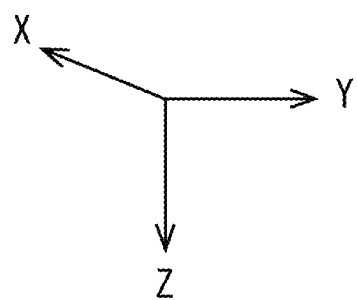
Figure 17:
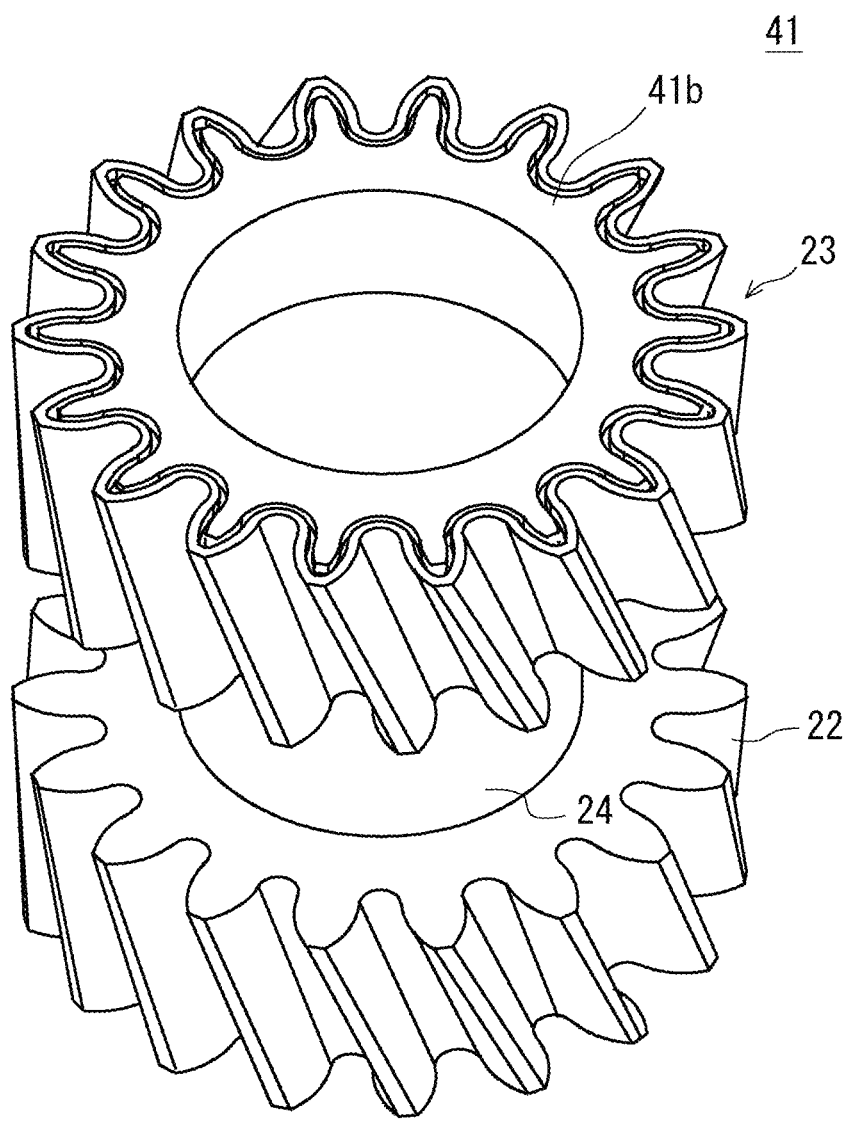
FIG. 17 is a different perspective view schematically showing the second punch according to the fourth embodiment.

A second punch according to this embodiment includes a transfer part that transfers a predetermined product shape to an end surface of the material M. FIG. 16 is a perspective view schematically showing the second punch according to this embodiment. FIG. 17 is a different perspective view schematically showing the second punch according to this embodiment. Note that the configuration of the second punch according to this embodiment is substantially the same as that of the second punch 21 according to the second embodiment, and thus duplicated explanations are omitted and the same members are explained using the same reference symbols.

When the second punch 21 according to the second embodiment is disposed between the materials M to form external teeth on the materials M, as described above, the tooth part 22a of the first plate member 22 substantially comes into contact with the surface of the region where the external teeth are formed on a surface of the Z-axis positive side of the material M disposed on the Z-axis negative side with respect to the second punch 21, and the tooth part 23a of the second plate member 23 substantially comes into contact with the surface of the region where external teeth are formed on a surface of the Z-axis negative side of the material M disposed on the Z-axis positive side with respect to the second punch 21.

In order to address the above problem, as shown in FIG. 16, a second punch 41 according to this embodiment includes, on the surface of the Z-axis negative side of the first plate member 22, a first transfer part 41a that transfers a predetermined product shape to a surface of the Z-axis positive side of the material M disposed on the Z-axis negative side with respect to the second punch 41.

Further, as shown in FIG. 17, the second punch 41 includes, on the Z-axis positive side of the second plate member 23, a second transfer part 41b that transfers a predetermined product shape to a surface of the Z-axis negative side of the material M disposed on the Z-axis positive side with respect to the second punch 41.

By disposing the above-described second punch 41 between the materials M and pushing the second punch 41 and the materials M, it is possible to easily transfer a predetermined product shape to a surface of the Z-axis negative side and a surface of the Z-axis positive side of the materials M. Accordingly, the number of steps of the post-processing performed after the helical gear G has been formed can be reduced. As a result, productivity of the helical gear G can be improved.

Note that the configuration of the second punch 41 according to this embodiment is substantially the same as that of the second punch 21 according to the second embodiment, but may be substantially the same as that of the second punch 20 according to the first embodiment. In this case, the transfer part may be formed on the surface of the Z-axis positive side and the surface of the Z-axis negative side of the second punch 20.

The present disclosure is not limited to the above-described embodiments, and can be appropriately changed without departing from the spirit of the disclosure. For example, in the above-described embodiments, the helical gear G is formed, but a spur gear can be substantially, similarly formed. For example, in the above-described embodiments, the helical gear G is continuously forged, but one gear may be forged at a time.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:
1. A method for forging a gear comprising:
    pushing a material into a through hole of a tooth profile die from one side of the tooth profile die by a first punch and then discharging a gear having external teeth formed thereon from the other side of the tooth profile die by the first punch;
    disposing, on the one side of the tooth profile die, a guide die that includes a through hole having an inside diameter size smaller than an outside diameter size of one end of the through hole of the tooth profile die so that a tooth profile groove formed on an inner peripheral surface of the guide die and a tooth profile groove formed on an inner peripheral surface of the tooth profile die are continuously connected with each other;
    pushing the material into the through hole of the guide die;

pushing a second punch into the through hole of the guide die subsequently to the material, thereby inserting a tooth pressing part composed of a tooth part formed on an outer peripheral part of the second punch into the tooth profile groove of the guide die to move the second punch along the tooth profile groove of the guide die, and stacking the material and the second punch in this order so as to be in a stacked state; and pushing the material and the second punch into the tooth profile groove of the tooth profile die in the stacked state to pass them therethrough, wherein the tooth pressing part of the second punch covers, when the material passes through the tooth profile groove of the tooth profile die, at least an edge of a region where the external teeth are formed on a surface of the material that faces the first punch.

2. The method for forging a gear according to claim 1, wherein an excess thickness of the material formed when the material passes through the tooth profile groove of the tooth profile die is shed from the material at a tooth base of the second punch when the second punch passes through the tooth profile groove of the tooth profile die, and is housed in a part of the second punch that is formed in an outer peripheral surface of the second punch so as to be recessed with respect to a virtual circle formed by connecting tooth bottoms of the gear.

3. The method for forging a gear according to claim 1, wherein an excess thickness of the material formed when the material passes through the tooth profile groove of the tooth profile die is continuously formed on a surface of the second punch that faces the material in a circumferential direction of the second punch when the second punch passes through the tooth profile groove of the tooth profile die, and is housed in a concave part of the second punch having an inside diameter size smaller than a diameter of a virtual circle formed by connecting tooth bottoms of the gear and an outside diameter size larger than the diameter of the virtual circle formed by connecting tooth bottoms of the gear.

4. An apparatus for forging a gear comprising:

a first punch that pushes a first material into a through hole of a tooth profile die from one side of the tooth profile die and then discharges a gear having external teeth formed thereon from the other side of the tooth profile die;

a second punch configured to be stacked with the first material; and a guide die configured to be disposed on one side of the tooth profile die and inserted with the first material and the second punch in this order, wherein the guide die comprises a through hole having an inside diameter size smaller than an outside diameter size of one end of the through hole of the tooth profile die, a tooth profile groove is formed on an inner peripheral surface of the guide die, and the tooth profile groove and a tooth profile groove that is formed on the tooth profile die are continuously connected with each other while the guide die is disposed on the one side of the tooth profile die, the first punch pushes the first material and the second punch into the tooth profile groove of the tooth profile die in a stacked state so that the first material and the second punch pass therethrough, and the second punch includes a tooth part serving as a tooth pressing part configured to press at least an edge of a region where external teeth are formed on a surface of the first material facing the first punch, and the tooth pressing part is inserted into the tooth profile groove of the guide die and the tooth profile groove of the tooth profile die.

5. The apparatus for forging a gear according to claim 4, wherein the second punch comprises:

a first plate member having the same cross-sectional shape as that of the gear;

a second plate member having the same cross-sectional shape as that of the gear and configured to be disposed at an interval from the first plate member in a thickness direction of the second punch; and a tubular member capable of passing through the through hole of the tooth profile die and configured to be disposed between the first plate member and the second plate member, and the tubular member is recessed with respect to a virtual circle formed by connecting tooth bottoms of the gear and includes a part that houses an excess thickness that is shed from the first material.

6. The apparatus for forging a gear according to claim 4, wherein a surface of the second punch that faces the first material configured to transfer a predetermined product shape to an end surface of the first material.

7. The apparatus for forging a gear according to claim 4, wherein the apparatus for forging a gear is a continuous forging apparatus in which the first material, the second punch, and a second material are inserted into the through hole of the guide die in this order, and a surface of the second punch facing the second material is configured to transfer a predetermined product shape to an end surface of the second material.

8. The apparatus for forging a gear according to claim 4, wherein the second punch comprises a concave part that is continuously formed on a surface of the second punch opposed to the first material in the circumferential direction of the second punch and houses an excess thickness of the first material, and the part has an inside diameter size smaller than the diameter of a virtual circle formed by connecting tooth bottoms of the gear and has an outside diameter size larger than the diameter of the virtual circle formed by connecting the tooth bottoms of the gear.

\* \* \* \* \*